United States Patent
Mauritz

(10) Patent No.: US 10,536,978 B2
(45) Date of Patent: Jan. 14, 2020

(54) CLASSIFICATION OF NON-STANDARD USER EQUIPMENT IN WIRELESS COMMUNICATION NETWORK

(71) Applicant: TELEFONAKTIEBOLAGET LM ERICSSON (PUBL), Stockholm (SE)

(72) Inventor: Oskar Mauritz, Johanneshov (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

(21) Appl. No.: 15/568,802

(22) PCT Filed: Apr. 29, 2016

(86) PCT No.: PCT/SE2016/050379
§ 371 (c)(1),
(2) Date: Oct. 24, 2017

(87) PCT Pub. No.: WO2016/190797
PCT Pub. Date: Dec. 1, 2016

(65) Prior Publication Data
US 2018/0115999 A1    Apr. 26, 2018

Related U.S. Application Data

(60) Provisional application No. 62/165,384, filed on May 22, 2015.

(51) Int. Cl.
*H04W 74/08* (2009.01)
*H04W 74/00* (2009.01)
(Continued)

(52) U.S. Cl.
CPC ... *H04W 74/0833* (2013.01); *H04W 72/0406* (2013.01); *H04W 74/008* (2013.01);
(Continued)

(58) Field of Classification Search
CPC . H04W 74/00; H04W 74/002; H04W 74/004; H04W 74/006; H04W 74/008;
(Continued)

(56) References Cited

U.S. PATENT DOCUMENTS 9,215,731 B2 *  12/2015  Kitazoe ............... H04W 74/004
9,681,354 B2 *   6/2017  Bangolae ............. H04W 4/70
(Continued)

FOREIGN PATENT DOCUMENTS

EP    2645758 A1    10/2013
WO    2015/110948 A1    7/2015

OTHER PUBLICATIONS

3GPP, "LS on PRACH coverage enhancement", 3GPP TSG RAN WG1 Meeting #80, Athens, Greece, Feb. 9-13, 2015, R1-150920.
(Continued)

*Primary Examiner* — Kevin D Mew
(74) *Attorney, Agent, or Firm* — Murphy, Bilak & Homiller, PLLC

(57) ABSTRACT

A wireless communication device determines its class, and identifies a logical channel identifier (LCID) value that is associated with the determined class within a radio access node. The device then generates a radio resource control (RRC) message including the identified LCID value, and transmits the generated RRC message to the radio access node. Upon receiving the LCID value, the radio access node determines whether the received LCID value is associated with a non-standard class of wireless communication device, and in response to determining that the received LCID value is associated with the non-standard class of wireless communication device, identifying the wireless communication device as belonging to the non-standard class of wireless
(Continued)

communication device, and transmitting information to the wireless communication device based on the non-standard class identification.

26 Claims, 16 Drawing Sheets

(51) Int. Cl.
*H04W 76/27* (2018.01)
*H04W 72/04* (2009.01)
*H04W 28/18* (2009.01)
*H04W 80/02* (2009.01)

(52) U.S. Cl.
CPC ............ *H04W 76/27* (2018.02); *H04W 28/18* (2013.01); *H04W 80/02* (2013.01)

(58) Field of Classification Search
CPC ......... H04W 74/0833; H04W 72/0406; H04W 72/0413; H04W 72/042; H04W 76/27; H04W 28/18; H04W 80/02
See application file for complete search history.

(56) References Cited

U.S. PATENT DOCUMENTS

| | | | | |
|---|---|---|---|---|
| 10,314,023 | B2 * | 6/2019 | Stattin | H04W 28/18 |
| 2011/0080860 | A1 * | 4/2011 | Hsu | H04W 72/12 |
| | | | | 370/312 |
| 2011/0299492 | A1 * | 12/2011 | Lee | H04W 4/00 |
| | | | | 370/329 |
| 2012/0087295 | A1 * | 4/2012 | Xu | H04W 28/18 |
| | | | | 370/312 |
| 2013/0039272 | A1 * | 2/2013 | Chen | H04W 76/25 |
| | | | | 370/328 |
| 2014/0198663 | A1 * | 7/2014 | Xu | H04W 52/383 |
| | | | | 370/241 |
| 2014/0198716 | A1 * | 7/2014 | Speight | H04W 72/0413 |
| | | | | 370/315 |
| 2014/0204835 | A1 * | 7/2014 | Speight | H04W 72/04 |
| | | | | 370/315 |
| 2014/0213237 | A1 * | 7/2014 | Yang | H04W 4/70 |
| | | | | 455/418 |
| 2014/0313908 | A1 * | 10/2014 | da Silva | H04W 4/70 |
| | | | | 370/252 |
| 2015/0043449 | A1 * | 2/2015 | Bangolae | H04W 4/70 |
| | | | | 370/329 |
| 2015/0173118 | A1 * | 6/2015 | Gholmieh | H04W 76/10 |
| | | | | 455/436 |
| 2015/0271746 | A1 * | 9/2015 | Jang | H04W 48/18 |
| | | | | 370/329 |
| 2016/0080531 | A1 * | 3/2016 | Agiwal | H04L 69/22 |
| | | | | 370/474 |
| 2016/0212737 | A1 * | 7/2016 | Jang | H04L 69/22 |
| 2016/0219624 | A1 * | 7/2016 | Lin | H04W 74/085 |
| 2017/0019932 | A1 * | 1/2017 | Su | H04W 74/0833 |
| 2017/0134124 | A1 * | 5/2017 | Lee | H04L 1/1812 |
| 2017/0156158 | A1 * | 6/2017 | Harris | H04W 52/0216 |
| 2018/0376492 | A1 * | 12/2018 | Wong | H04L 1/0046 |

OTHER PUBLICATIONS

3GPP, 3rd Generation Partnership Project; Technical Specification Group Radio Access Network;Study on provision of low-cost Machine-Type Communications (MTC) User Equipments (UEs) based on LTE (release 12), 3GPP TR 36.888 V12.0.0 (Jun. 2013).

3GPP; "3rd Generation Partnership Project; Technical Specification Group Radio Access Network; Evolved Universal Terrestrial Radio Access (E-UTRA); Physical channels and modulation (Release 12), 3GPP TS 36.211 V12.4.0 (Dec. 2014)", Section 5.7.2.

3GPP, "3rd Generation Partnership Project, Technical Specification Group Radio Access Network, Evolved Universal Terrestrial Radio Access (E-UTRA), User Equipment (UE) radio access capabilities (Release 12)", 3GPP TS 36.306 V12.3.0 (Dec. 2014).

3GPP, "3rd Generation Partnerhip Project, Technical Specification Group Radio Access Network, Evolved Universal Terrestrial Radio Access (E-UTRA), Medium Access Control (MAC) protocol specification (Release 12)", 3GPP TS 36.321 V12.4.0 (Dec. 2014).

3GPP, "3rd Generation Partnership Project, Technical Specification Group Radio Access Network, Evolved Universal Terrestrial Radio Access (E-UTRA), Radio Resource Control (RRC), Protocol specification (Release 12)", 3GPP TS 36.331 V12.4.1 (Dec. 2014), Sections 5.6.3, 6.2.2, 6.3.6.

Intel Corporation: Analysis of solutions restricting UL grant for category 0 UEs, 3GPP draft, R1-144165, 3rd Generation Partnership Project (#GPP), vol. RAN WG2, Shanghai, China, Oct. 6, 2014-Oct. 10, 2014, Oct. 5, 2014, XP050876431, Solution 5 and 6, paragraph [0002].

Samsung, "Cat.0 UE capability in Msg3", 3GPP draft, R2-144243, 3rd Generation Partnership Project (3GPP), Sophia-Anipolis Cedex, France, Oct. 6, 2014-Oct. 10, 2014, Oct. 5, 2014, XP050876479, Paragraph [6.2.1].

Ericsson, "Indication of category for low complexity UEs", 3GPP draft, 36.321 (REL-12), R2-143331 3rd Generation Partnership Program (3GPP), Aug. 18, 2014-Aug. 22, 2014 (Aug. 17, 2014), XP050794076, Paragraph [6.2.1].

Samsung, "Indication of Cat.0 UE capability", 3GPP draft, R2-144242, 3rd Generation Partnership Project (3GPP), Shanghai, P.R. China, Oct. 6, 2014-Oct. 10, 2014, (Sep. 26, 2014), XP050870217, Paragraph [002].

\* cited by examiner

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

FIG. 1

| Index | LCID values |
|---|---|
| 00000 | CCCH |
| 00001-01010 | Identity of the logical channel |
| 01011 | CCCH |
| 01100-10111 | Reserved |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG. 2

| Index | Size of Length field (in bits) |
|-------|-------------------------------|
| 0     | 7                             |
| 1     | 15                            |

FIG. 3

| Index | LCID values |
|---|---|
| 00000 | MCCH (see note) |
| 00001-11100 | MTCH |
| 11101 | Reserved |
| 11110 | MCH Scheduling Information |
| 11111 | Padding |

NOTE: If there is no MCCH on MCH, an MTCH could use this value.

FIG. 4

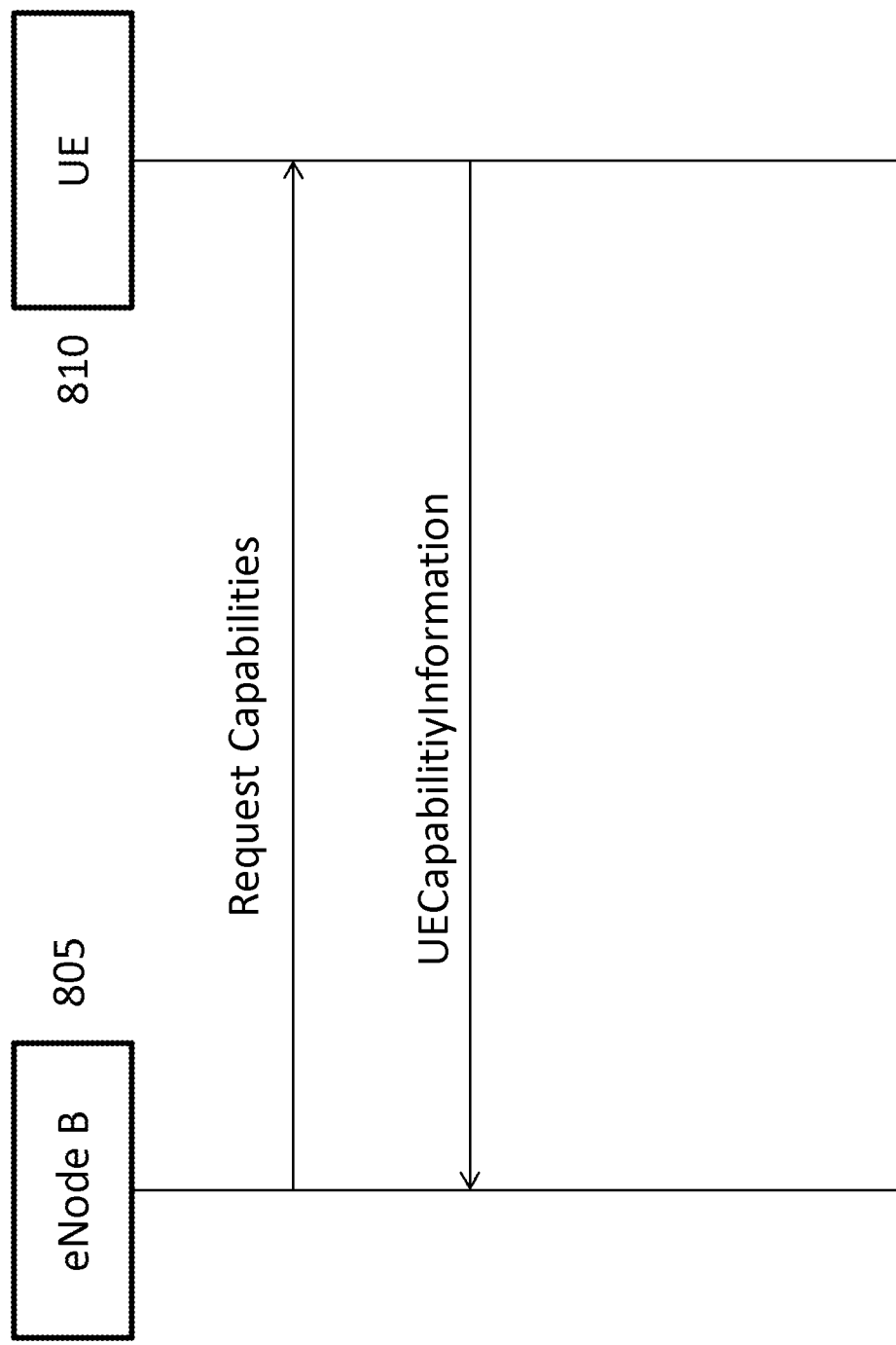

| Index | LCID values |
|---|---|
| 00000 | CCCH |
| 00001-01010 | Identity of Logical Channel / Non-Standard UE |
| 01011 | CCCH |
| 01100-10111 | Reserved |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

FIG. 9

CLASSIFICATION OF NON-STANDARD USER EQUIPMENT IN WIRELESS COMMUNICATION NETWORK

CROSS-REFERENCE TO RELATED APPLICATIONS

This application claims priority to U.S. Provisional Patent Application No. 62/165,384 filed on May 22, 2015, the disclosure of which is hereby incorporated by reference.

TECHNICAL FIELD

The disclosed subject matter relates generally to telecommunications and more particularly to techniques and technologies for classification of user equipment in a wireless communication network.

BACKGROUND

In communication networks such as those based on Long Term Evolution (LTE) as specified by the Third Generation Partnership Project (3GGP), there are certain data layer functions designed for mass communication with a large number of wireless devices, commonly referred to as "user equipments" (UEs). Some data layer functions are designed for peer-to-peer control of transport channels and for mapping between transport channels and logical channels. Examples of such functions include those used by the Radio Resource Control (RRC) protocol.

According to the Evolved Packet System (EPS) defined by the 3GPP LTE architecture, the radio access network is referred to as an Evolved Universal Terrestrial Radio Access Network (E-UTRAN). The E-UTRAN includes base stations, referred to as eNodeBs (eNBs) that provide E-UTRA user-plane and control-plane protocol terminations towards the UEs. User-plane protocol examples include Packet Data Convergence Protocol (PDCP), Radio Link Control (RLC), Medium Access Control (MAC), and Physical Layer (PHY), while control-plane protocol examples include RRC.

The eNBs are connected by an "S1" interface to a core network, which is referred to as an Evolved Packet Core (EPC). More specifically, the eNBs have S1 connections to a Mobility Management Entity (MME), through an S1-MME interface and to a Serving Gateway (S-GW), through an S1-U interface. Upon request from an MME, an eNB performs an E-RAB to radio bearer mapping and establishes a Data Radio Bearer and allocates the required resources on the air interface, referred to as the "Uu" interface. The eNB also sets up a logical channel for the UE and allocates it to a transport channel. These operations involve the MAC layer.

3GPP specifies the E-UTRAN MAC protocol as a sublayer of layer 2. Functions of the MAC sublayer are performed by MAC entities in the UE and in the E-UTRAN. For a MAC entity configured at the eNB, there is a peer MAC entity configured at the UE and vice versa.

A mapping of logical channels to transport channels at the MAC sublayer is configured by RRC signaling. There is one Logical Channel Identifier (LCD) field for each MAC service data unit (SDU) included in the corresponding MAC protocol data unit (PDU). The LCID field size is 5 bits, where the value 00000 is reserved for CCCH and the value 11111 is reserved for padding. The LCID for the Downlink Shared Channel (DL-SCH) uses the range 11010-11110 for MAC Control Elements (MAC CEs). A MAC CE is an explicit MAC inband control message. The range 01011-11001 is reserved for future needs within the framework of the controlling standard. Similarly, the LCID for the Uplink Shared Channel (UL-SCH) uses the range 11000-11110 for explicit MAC inband control, while the range 01100-10111 is reserved for future needs within the standard.

The LCID values that are predefined for use in identifying logical channels in the MAC sublayer are 00001-01010. From within this range, the LCID values of 00001 and 00010 are reserved for the signaling radio bearers used by RRC. Consequently, there are eight LCID values available for mapping logical channels to data radio bearers.

These and other details can be seen in the following FIGS. 1-4, which include tables excerpted from 3GPP TS 36.321, V12.4.0 (2015-01). In particular, FIG. 1 depicts "Table 6.2.1-1 Values of LCID for DL-SCH", FIG. 2 depicts "Table 6.2.1-2 Values of LCID for UL-SCH", FIG. 3 depicts "Table 6.2.1-3 Values of F field", and FIG. 4 depicts "Table 6.2.1-4 Values of LCID for MCH".

From the above information and FIGS. 1-4, one sees that in the example context of LTE, there is a relatively scarce set of occupied LCID values within the predefined set(s) of available LCID values. Moreover, one sees that the standard tightly controls the meaning and use of the available LCID values. As a general proposition, conformance to these default meanings or mappings is required for proper operation between the network and the wireless devices. Moreover, to the extent that one might wish to deviate from or expand these default mappings, standardizing new LCIDs for MAC control or other purposes is a slow, cumbersome process.

The transmission of an LCID value from a UE to a network node typically occurs in the context of a random access process used for connection setup, as described below. More specifically, transmission of the LCID value typically occurs within RRC signaling of a Message 3, as described below.

The UE initiates the random access process by transmitting a random access preamble to an eNB via a physical random access channel (PRACH), a transmission commonly referred to as Message 1 (Msg1). In some circumstances, including so-called "contention-free" random access, the transmitted preamble may be assigned by the network. Alternatively, in other circumstances, including so-called "contention-based" random access, the transmitted preamble may be randomly selected by the UE from one of multiple possible groups of preambles (e.g. preamble groups A and B).

In contention-based random access, selection of a preamble from a particular group may be used to convey information about the amount of data the UE desires to transmit in subsequent transmissions. For example, selection of a preamble from group A may indicate that the UE desires to transmit a relatively low amount of data, while selection of a preamble from group B may indicate that the UE desires to transmit a relatively high amount of data, or vice versa.

Once a preamble has been transmitted by the UE and detected by the eNB, the eNB transmits a Random Access Response to the UE on a downlink shared channel (DL-SCH), a transmission commonly referred to as Message 2 (Msg2). Thereafter, the UE transmits an RRC connection request message to the eNB on an uplink shared channel (UL-SCH), a transmission commonly referred to as Message 3 (Msg3). The UE and eNB then communicate using the RRC protocol to establish a connection for data transport between the UE and the network.

Once the UE is connected to the eNB, the eNB facilitates data transport between the UE and the network. In general, the data transport performance may be limited by the radio access capability of the UE, which may be indicated by a UE classification or some other mechanism. Different types of UEs, for instance, may have different radio access capabilities as defined in 3GPP TS 36.306, such as number of receive antennas, maximum number of layers for uplink transmission, maximum data rates in uplink and downlink.

The eNB generally needs to know UE capabilities in order to properly assign resources, perform control functions, and conduct communication with the UE, among other things. The eNB may obtain information regarding UE capability in any of several ways.

In a typical approach employed in E-UTRA, for example, a UE conveys its capability to the eNB in an RRC UECapabilityInformation message as defined in 3GPP TS 36.331. This information is typically sent upon request from the eNB, after an RRC connection is established.

In an alternative approach, a Category 0 UE, as defined in 3GPP TS 36.306, has restrictions on transport block size, which requires UE capability to be known by the eNB before the RRC connection is established. A Category 0 UE therefore signals its category in the random access procedure, more specifically using a particular logical channel identifier (LCID) in Random Access Msg 3, as defined in 3GPP TS 36.321.

In yet another alternative approach, an even earlier communication of UE capability is proposed. For 3GPP Rel-13, a coverage-limited UE can convey its so-called PRACH repetition level by the random access preamble that it transmits, as described in 3GPP TR 36.888 and 3GPP Tdoc R1-150920. In other words, the UE capability can be identified based on the initial transmission of the random access preamble. To that end the preambles in a cell are partitioned into more groups than preamble groups A and B and the group of preambles for contention-free random access. The network can then apply relevant coverage-enhancement schemes already from the random access response. Coverage-limited UEs may repeatedly transmit the same preamble in several PRACH both to be detected and to be classified by the eNB.

SUMMARY

In the future, even more classes of UEs may appear that require special handling, not confined to coverage enhancement, in the eNB from random access response and onwards. Such classes may also include non-standard UEs. In existing approaches, classification of repetition level and Random Access Msg 3 payload, as well as identification of individual UEs, using contention-free random access, can be made based on the received preamble. However, because the total number of preambles in a cell is limited to 64, as discussed in 3GPP TS 36.211, and because 3GPP Rel-13 may specify a large set of different preamble groups for various purposes, further partitioning of the preambles may increase the risk of contention on PRACH beyond what is desirable or even acceptable.

For UEs to be used temporarily, e.g. for demonstration purposes, it is possible to use reserved bits or bit strings in existing protocols, e.g. the MAC or RRC protocol. However, using reserved bits or bit strings for partially standard-compliant UEs that appear in mobile communications networks for a longer time and are not supported by all networks is not desirable. The reason is that the reserved bits or bit strings may be used in later releases of the standard. For example, a Category 0 UE is identified from E-UTRA Rel-12 when transmitting the LCID "01011" in Random Access Msg 3. This LCID has been reserved in earlier releases of E-UTRA. Similarly, the LCID was reserved before Rel-12 when it was assigned the value "Dual Connectivity Power Headroom Report".

In recognition of at least the above considerations, the disclosed subject matter provides certain embodiments in which a wireless communication device (e.g., a UE) uses a standard-defined LCID to signal its class. For instance, an LCD that is not otherwise used in Random Access Msg3 may be specified for a UE and a radio access node to make an unambiguous identification of a UE class.

In certain embodiments, a method of operating a radio access node comprises receiving an LCD value from a wireless communication device, determining whether the received LCID value is associated with a non-standard class of wireless communication device, and in response to determining that the received LCID value is associated with the non-standard class of wireless communication device, identifying the wireless communication device as belonging to the non-standard class of wireless communication device and transmitting information to the wireless communication device based on the non-standard class identification.

In certain related embodiments, the method further comprises reserving a first subset of available LCID values for identification of logical channels in a MAC layer of E-UTRA, and reserving a second subset of the available LCID values for identification of one or more non-standard classes of wireless communication device, wherein the received LCID value is within the second subset of the available LCID values.

In certain other related embodiments, the method further comprises determining whether the wireless communication device is known to a cell associated with the radio access node, and performing the determination of whether the received LCD value is associated with the non-standard class of wireless communication device in response to determining that the wireless communication device is not known to the cell.

In certain other related embodiments, transmitting information to the wireless communication device based on the non-standard class identification comprises assigning resources or performing control functions based on the non-standard class identification.

In certain other related embodiments, the LCID value is within a range of 00001 to 01010. In certain other related embodiments, the non-standard class of wireless communication device is a partially standard-compliant class of wireless communication device. In certain other related embodiments, the LCID value is received in Random Access Message 3.

In certain embodiments, the method comprises receiving information transmitted by the radio access node based on an identification of the wireless communication device as belonging to a non-standard class. For instance, the wireless communication device may receive information corresponding to one or more control functions based on the non-standard class identification to restrict how fast the wireless communication device needs to send a Message 3 after receiving a Random Access Response from the radio access node.

In certain other related embodiments, the method further comprises, in response to identifying the wireless communication device as belonging to the non-standard class of wireless communication device, performing repetition or power boosting of the transmission for increased coverage.

In certain other related embodiments, transmitting information to the wireless communication device based on the non-standard class identification comprises performing one or more control functions based on the non-standard class identification to restrict how fast the wireless communication device needs to send a Message 3 after receiving a Random Access Response from the radio access node.

In certain embodiments, a method of operating a wireless communication device in a wireless communication network comprises determining a class of the wireless communication device, identifying a logical channel identifier (LCID) value that is associated with the determined class in a radio access node of the wireless communication network, generating a radio resource control (RRC) message including the identified LCID value, and transmitting the generated RRC message to the radio access node to indicate the class.

In certain related embodiments, the LCID value is within a subset of available LCID values that has been reserved for identification of one or more non-standard classes of wireless communication device, wherein the subset is distinguishable from another subset of the available LCID values that has been reserved for identification of logical channels in a MAC layer of E-UTRA.

In certain other related embodiments, the method further comprises receiving control information from the radio access node to control how fast the wireless communication device needs to send a Message 3 after receiving a Random Access Response, wherein the control information is associated with the determined class. In certain other related embodiments, the LCID value is within a range of 00001 to 01010.

In certain other related embodiments, the determined class is a non-standard class of wireless communication device. The non-standard class of wireless communication device may be, for instance, a partially standard-compliant class of wireless communication device.

In certain embodiments, a radio access node comprises at least one processor configured to receive an LCID value from a wireless communication device, determine whether the received LCID value is associated with a non-standard class of wireless communication device, and in response to determining that the received LCID value is associated with the non-standard class of wireless communication device, identify the wireless communication device as belonging to the non-standard class of wireless communication device and transmit information to the wireless communication device based on the non-standard class identification.

In certain related embodiments, the at least one processor is further configured to reserve a first subset of available LCID values for identification of logical channels in a MAC layer of E-UTRA, and reserve a second subset of the available LCID values for identification of one or more non-standard classes of wireless communication device, wherein the received LCID value is within the second subset of the available LCID values.

In certain other related embodiments, the at least one processor is further configured to determine whether the wireless communication device is known to a cell associated with the radio access node, and perform the determination of whether the received LCID value is associated with the non-standard class of wireless communication device in response to determining that the wireless communication device is not known to the cell.

In certain other related embodiments, the transmission of information to the wireless communication device based on the non-standard class identification comprises assigning resources or performing control functions based on the non-standard class identification.

In certain other related embodiments, the LCID value is within a range of 00001 to 01010. The non-standard class of wireless communication device may be, for instance, a partially standard-compliant class of wireless communication device. In certain other related embodiments, the LCID value is received in Random Access Message 3.

In certain other related embodiments, the at least one processor is further configured to, in response to identifying the wireless communication device as belonging to the non-standard class of wireless communication device, perform repetition or power boosting of the transmission for increased coverage.

In certain other related embodiments, the transmission of information to the wireless communication device based on the non-standard class identification comprises performing one or more control functions based on the non-standard class identification to restrict how fast the wireless communication device needs to send a Message 3 after receiving a Random Access Response from the radio access node.

In certain embodiments, a wireless communication device comprises at least one processor configured to determine a class of the wireless communication device, identify an LCID value that is associated with the determined class in a radio access node of the wireless communication network, generate a radio resource control (RRC) message including the identified LCID value, and transmit the generated RRC message to the radio access node to indicate the class.

In certain related embodiments, the LCID value is within a subset of available LCID values that has been reserved for identification of one or more non-standard classes of wireless communication device, wherein the subset is distinguishable from another subset of the available LCID values that has been reserved for identification of logical channels in a MAC layer of E-UTRA.

In certain other related embodiments, the at least one processor is further configured to receive control information from the radio access node to control how fast the wireless communication device needs to send a Message 3 after receiving a Random Access Response, wherein the control information is associated with the determined class.

In certain other related embodiments, the LCID value is within a range of 00001 to 01010. In certain other related embodiments, the determined class is a non-standard class of wireless communication device.

In certain other related embodiments, the non-standard class of wireless communication device is a partially standard-compliant class of wireless communication device.

In certain embodiments, a radio access node comprises a receiving module configured to receive an LCID value from a wireless communication device, a first determining module configured to determine whether the received LCID value is associated with a non-standard class of wireless communication device, and an identification module and a transmission module collectively configured to, in response to determining that the received LCID value is associated with the non-standard class of wireless communication device, identify the wireless communication device as belonging to the non-standard class of wireless communication device and transmit information to the wireless communication device based on the non-standard class identification.

In certain related embodiments, the radio access node further comprises a first reserving module configured to reserve a first subset of available LCID values for identification of logical channels in a MAC layer of E-UTRA, and a second reserving module configured to reserve a second subset of the available LCID values for identification of one or more non-standard classes of wireless communication device, wherein the received LCID value is within the second subset of the available LCID values.

In certain other related embodiments, the radio access node further comprises a second determining module configured to determine whether the wireless communication device is known to a cell associated with the radio access node, and a third determining module configured to perform the determination of whether the received LCID value is associated with the non-standard class of wireless communication device in response to determining that the wireless communication device is not known to the cell.

In certain other related embodiments, the transmission of information to the wireless communication device based on the non-standard class identification comprises assigning resources or performing control functions based on the non-standard class identification.

In certain other related embodiments, the LCID value is within a range of 00001 to 01010. In certain other related embodiments, the non-standard class of wireless communication device is a partially standard-compliant class of wireless communication device. In certain other related embodiments, the LCID value is received in Random Access Message 3.

In certain other related embodiments, the radio access node further comprises a repetition module or power boosting module configured to, in response to identifying the wireless communication device as belonging to the non-standard class of wireless communication device, perform repetition or power boosting of the transmission for increased coverage.

In certain other related embodiments, the transmission of information to the wireless communication device based on the non-standard class identification comprises performing one or more control functions based on the non-standard class identification to restrict how fast the wireless communication device needs to send a Message 3 after receiving a Random Access Response from the radio access node.

In certain embodiments, a wireless communication device comprises a determining module configured to determine a class of the wireless communication device, an identification module configured to identify an LCID value that is associated with the determined class in a radio access node of the wireless communication network, a generating module configure to generate a radio resource control (RRC) message including the identified LCD value, and a transmission module configured to transmit the generated RRC message to the radio access node to indicate the class.

In certain related embodiments, the LCD value is within a subset of available LCID values that has been reserved for identification of one or more non-standard classes of wireless communication device, wherein the subset is distinguishable from another subset of the available LCID values that has been reserved for identification of logical channels in a MAC layer of E-UTRA.

In certain other related embodiments, the wireless communication device further comprises a receiving module configured to receive control information from the radio access node to control how fast the wireless communication device needs to send a Message 3 after receiving a Random Access Response, wherein the control information is associated with the determined class. In certain other related embodiments, the LCID value is within a range of 00001 to 01010. In certain other related embodiments, the determined class is a non-standard class of wireless communication device. The non-standard class of wireless communication device may be, for instance, a partially standard-compliant class of wireless communication device.

BRIEF DESCRIPTION OF THE DRAWINGS

The drawings illustrate selected embodiments of the disclosed subject matter. In the drawings, like reference labels denote like features.

FIG. 1 depicts "Table 6.2.1-1 Values of LCID for DL-SCH" from 3GPP TS 36.321, V12.4.0 (2015-01).

FIG. 2 depicts "Table 6.2.1-2 Values of LCID for UL-SCH" from 3GPP TS 36.321, V12.4.0.

Figure 3:
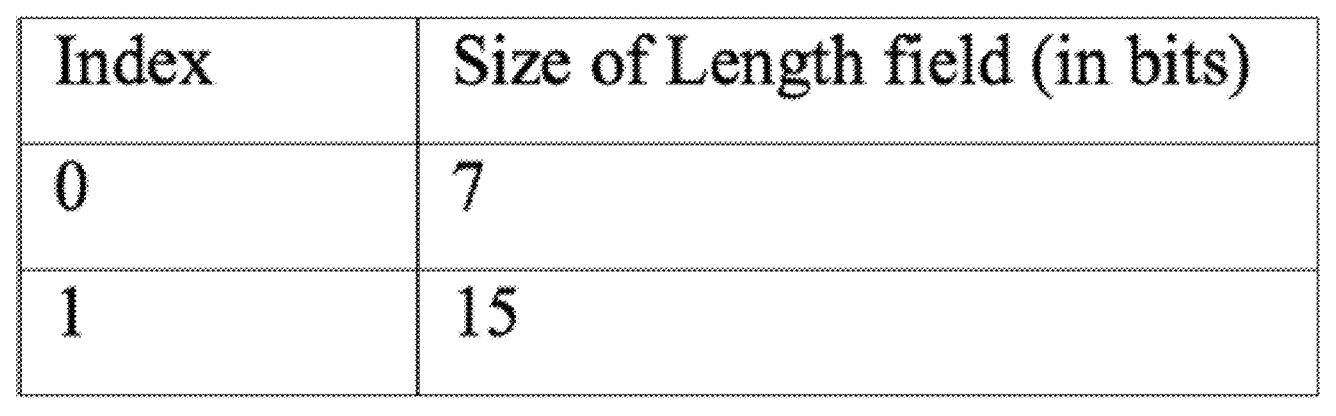

FIG. 3 depicts "Table 6.2.1-3 Values of F field" from 3GPP TS 36.321, V12.4.0.

FIG. 4 depicts "Table 6.2.1-4 Values of LCID for MCH" from 3GPP TS 36.321, V12.4.0.

FIG. 8B is a diagram illustrating an exchange of UE capability information in the context of a random access process such as that illustrated in FIG. 8A according to an embodiment of the disclosed subject matter.

FIG. 9 is a table of LCID values according to an embodiment of the disclosed subject matter.

DETAILED DESCRIPTION

Figure 5A:
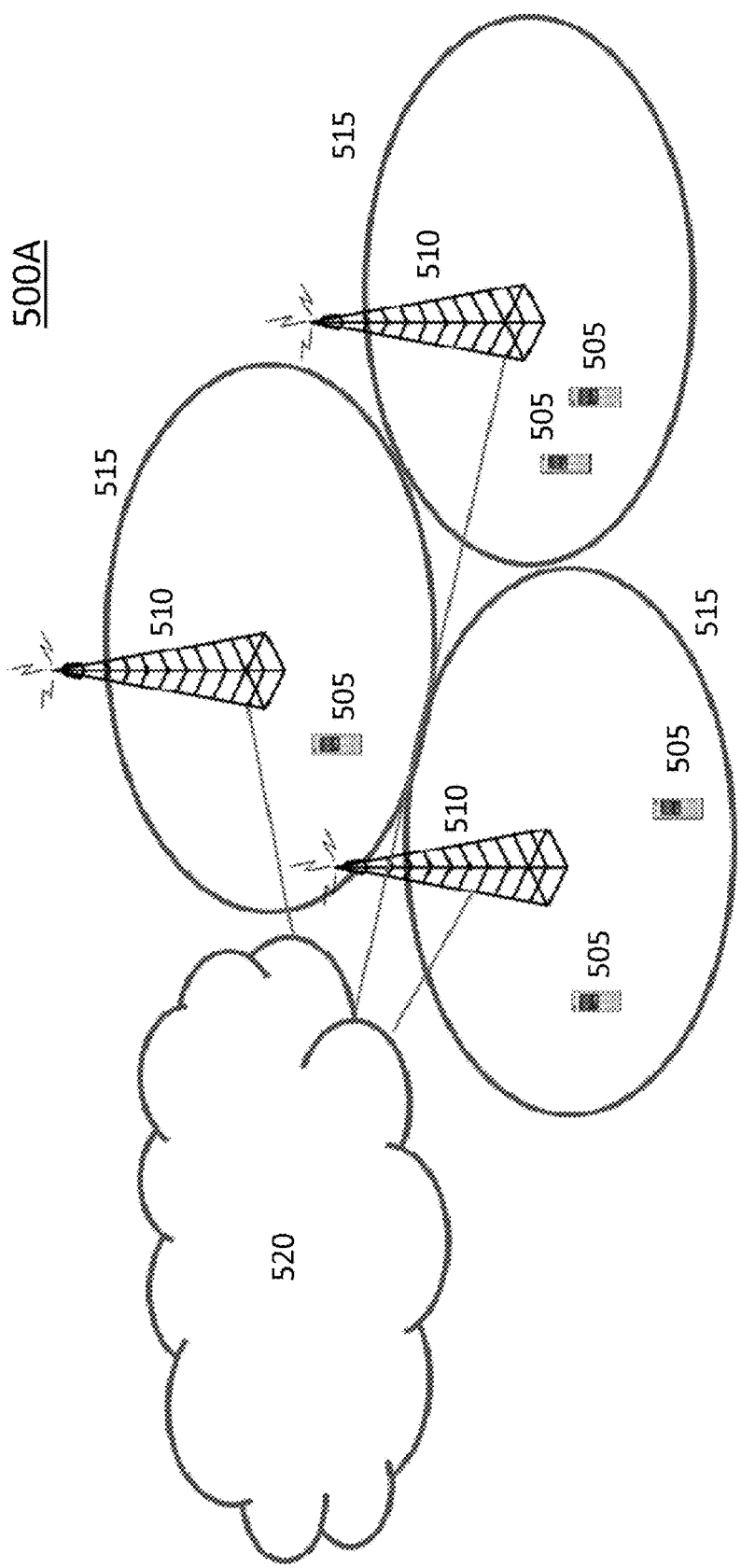
FIG. 5A is a diagram illustrating an LTE network according to an embodiment of the disclosed subject matter.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In certain embodiments described below, a UE with a non-standard class uses a standard-defined LCID in Random Access Msg 3 to signal its class. An LCID that is not otherwise used in Random Access Msg 3 is specified for the UE and the network to make the meaning of the LCID unambiguous.

One potential benefit of the described embodiments is to enable the identification of a partially standard-compliant UE or a UE with functionality beyond what is defined in a standard. The term "partially standard-compliant" device refers to a device that fulfills some but not all requirements on a standard device, it may e.g. have worse receiver performance or have transmission duty cycle restrictions.

Consider an example where an eNB reserves an LCD, from a set of LCIDs that are predefined or otherwise specified for use in identifying Logical Channels at the MAC layer. In this example, the eNB operates according to a controlling standard or technical specification that conventionally defines and restricts use of the LCIDs by the eNB to the "standard use" defined in the specification. Moreover, in this context "reserving" means reserving or otherwise designating or selecting the LCID for an alternate use.

The alternate use differs from the use specified by the controlling standard. For example, the controlling standard may specify that the LCID be used for identifying logical channels at the MAC layer or sub-layer, but according to certain embodiments of the disclosed subject matter the selected LCID may be put to an alternate use at least temporarily.

In general, where an LCID from the defined set or range is not being used for its standard use the eNB can re-define or repurpose that LCID for some alternate use and do so without necessarily introducing incompatibility with the controlling standard(s). The LCID selected for alternate use can be used in any number of ways, including these non-limiting examples: to define a new control element, a new control signaling message, a new container or data element, or a new logical channel. Here, the word "new" denotes a custom, non-standard use that is not defined by the applicable controlling standard. More broadly, it will be appreciated that the re-purposed LCID extends the signaling support between the network and the wireless device.

At initial access to a cell in the radio access network a UE of a particular UE class that is not defined by the standard performs the Random Access Preamble transmission as defined by the standard. Upon successful reception of the Random Access Response the UE transmits the Random Access Msg 3.

The described embodiments may be implemented in any appropriate type of communication system supporting any suitable communication standards and using any suitable components. As one example, certain embodiments may be implemented in an LTE network, such as that illustrated in any of FIGS. 5A-5C.

Referring to FIG. 5A, a communication network 500 comprises a plurality of wireless communication devices 505 (e.g., conventional UEs, machine type communication [MTC]/machine-to-machine [M2M] UEs) and a plurality of radio access nodes 510 (e.g., eNodeBs or other base stations). Communication network 500 is organized into cells 515, which are connected to a core network 520 via corresponding radio access nodes 510. Radio access nodes 510 are capable of communicating with wireless communication devices 505 along with any additional elements suitable to support communication between wireless communication devices or between a wireless communication device and another communication device (such as a landline telephone).

Figure 6:
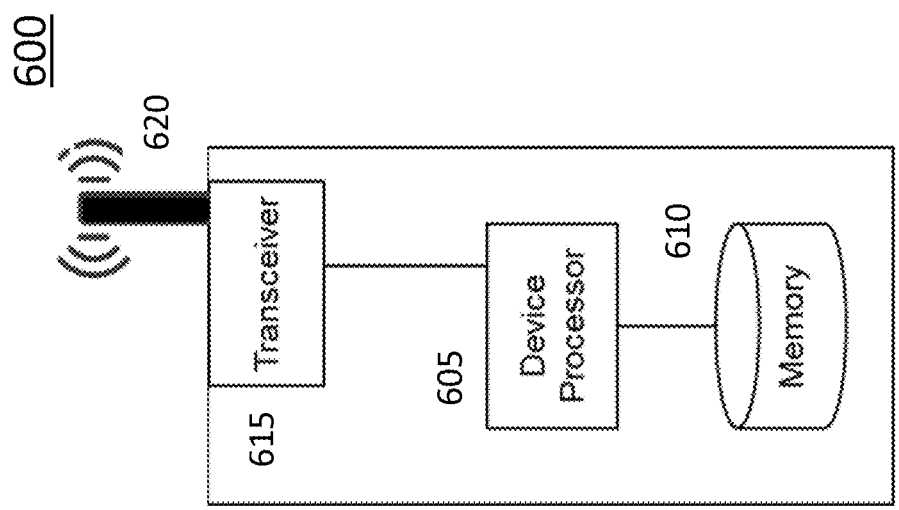
FIG. 6 is a diagram illustrating a wireless communication device according to an embodiment of the disclosed subject matter.

Although wireless communication devices 505 may represent communication devices that include any suitable combination of hardware and/or software, these wireless communication devices may, in certain embodiments, represent devices such as an example wireless communication device illustrated in greater detail by FIG. 6. Similarly, although the illustrated radio access node may represent network nodes that include any suitable combination of hardware and/or software, these nodes may, in particular embodiments, represent devices such as the example radio access node illustrated in greater detail by FIG. 7.

Figure 5B:
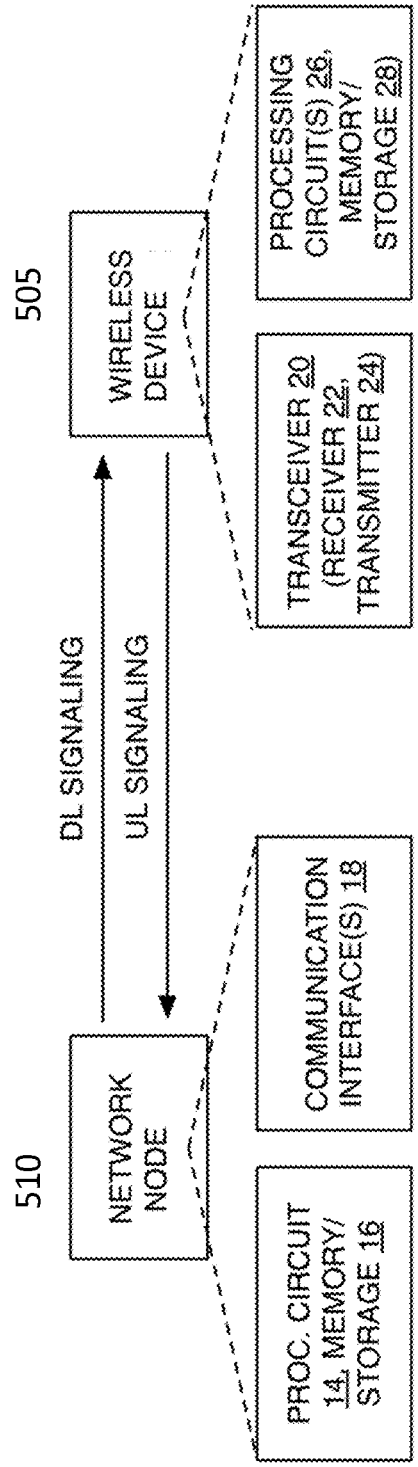
FIG. 5B is a diagram illustrating an example wireless communication device and radio access node in the LTE network of FIG. 5A according to an embodiment of the disclosed subject matter.
Figure 5C:
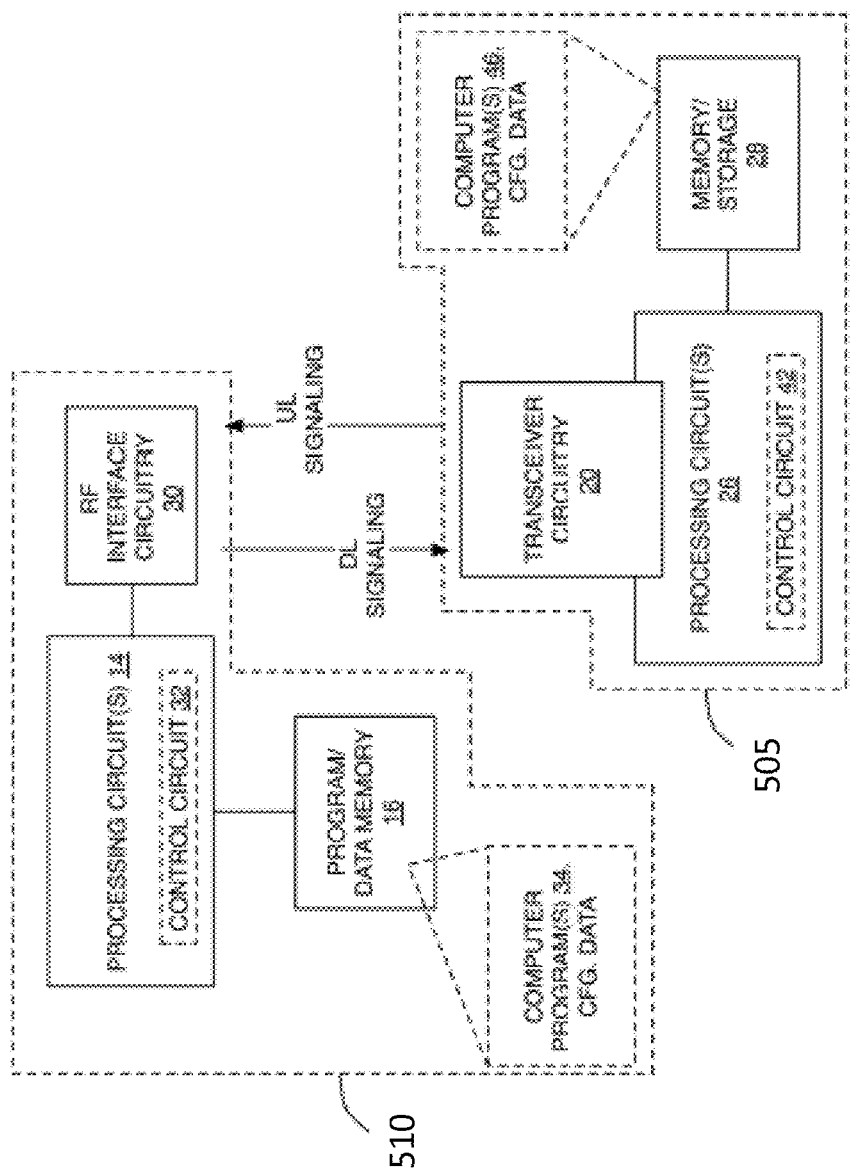
FIG. 5C is a diagram illustrating another example wireless communication device and radio access node in the LTE network of FIG. 5A according to an embodiment of the disclosed subject matter.

FIG. 5B illustrates a more specific example of radio access node 510 and wireless communication device 505 that could be used in a network such as that illustrated in FIG. 5A. FIG. 5C illustrates another more specific example of radio access node 510 and wireless communication device 505 that could be used in a network such as that illustrated in FIG. 5A. Radio access node 510 may comprise, e.g., a type of base station or another radio node within the Radio Access Network, RAN, portion of a wireless communication network. In at least some embodiments, radio access node 510 comprises an LTE eNB and wireless communication device 505 comprises a UE configured for operation in LTE-based networks.

FIG. 5C illustrates functional and/or physical circuit arrangements and that radio access node 510 and wireless communication device 505 generally will include digital processing circuits and associated memory or other computer-readable medium for storing configuration data, operational or working data, and for storing computer program instructions. In at least some of the embodiments contemplated herein, the network-side and device-side functionality is realized at least in part through the programmatic configuration of digital processing circuitry, based on the execution by that circuitry of stored computer program instructions.

One sees from the example that radio access node 510 comprises a processing circuit 14 and associated memory/storage 16. Memory/storage 16 comprises, for example, one or more types of computer-readable medium, such as a mix of volatile, working memory and non-volatile configuration and program memory or storage. Radio access node 510 further comprises one or more communication interfaces 18.

Communication interface 18 depends on the nature of the network node 10. In a base station or other radio node example, the communication interface 18 includes a radio transceiver, e.g., pools of radio transmission, reception, and processing circuitry, for communicating with any number of wireless devices 505 in any one or more cells of a wireless communication network. In such example cases, the communication interface 18 includes one or more transmitters and receivers, e.g., cellular radio circuits, along with power control circuitry and associated signal-processing circuitry. Further, in the same scenario, the communication interface 18 may include inter-base-station interfaces and/or backhaul or other Core Network, CN, communication interfaces.

Regardless of its intended use, FIG. 5B illustrates wireless communication device 505 as including a communication interface, e.g., a radiofrequency transceiver 20 that includes a receiver 22 and a transmitter 24. The illustrated wireless communication device 505 further comprises one or more processing circuits 26, which include or are associated with one or more memory/storage devices or circuits 28. The memory/storage devices or circuits 28 include, for example, one or more types of computer-readable medium, such as a mix of volatile, working memory and non-volatile configuration and program memory or other storage.

FIG. 6 shows a more general example of a wireless communication device that may be used in a network such as that illustrated in FIG. 5A.

Referring to FIG. 6, a wireless communication device 600 comprises a processor 605, a memory, a transceiver 615, and an antenna 620. In certain embodiments, some or all of the functionality described as being provided by UEs, MTC or M2M devices, and/or any other types of wireless communication devices may be provided by the device processor executing instructions stored on a computer-readable medium, such as the memory shown in FIG. 6. Alternative embodiments may include additional components beyond those shown in FIG. 6 that may be responsible for providing certain aspects of the device's functionality, including any of the functionality described herein.

Figure 7:
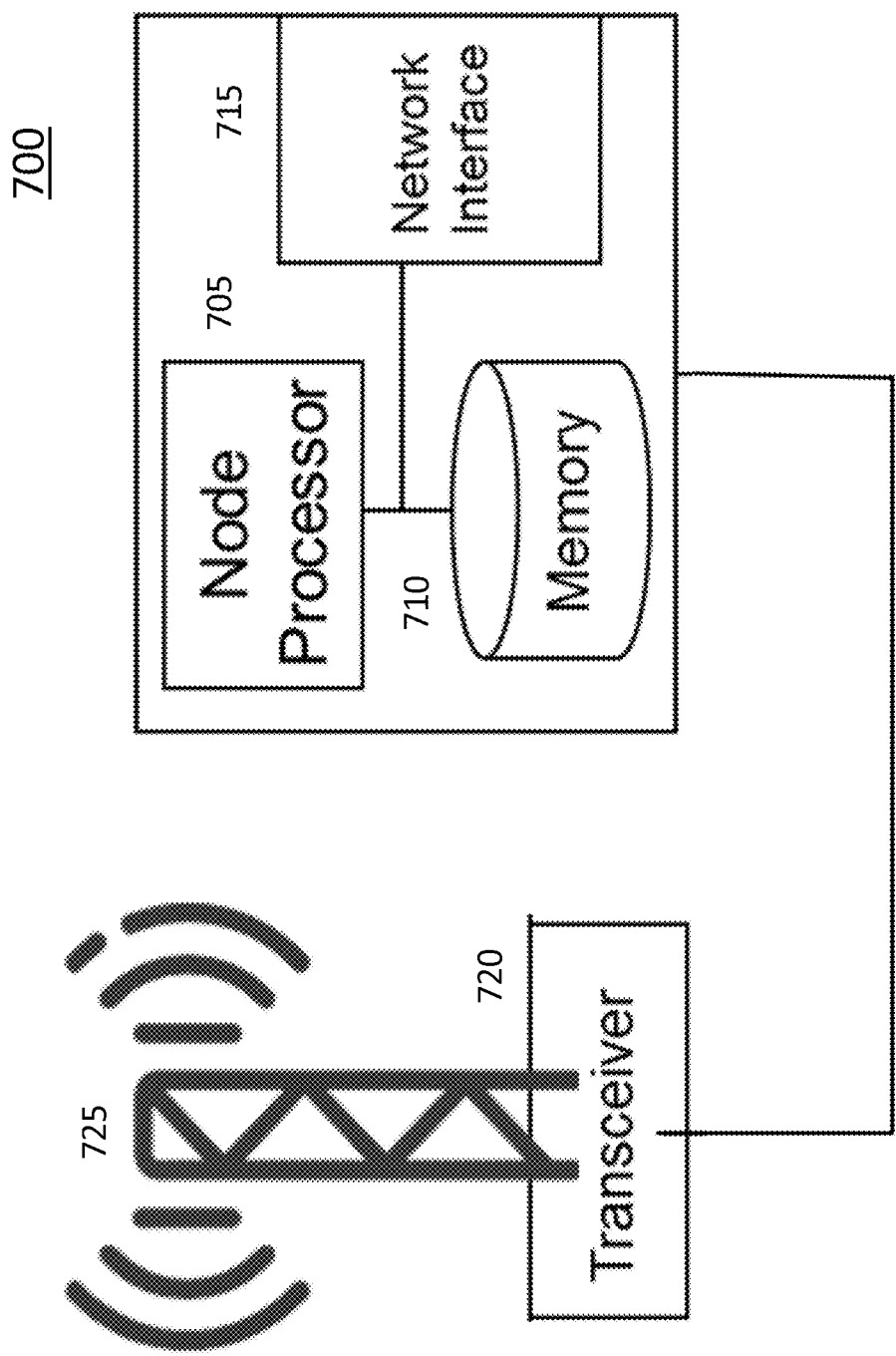
FIG. 7 is a diagram illustrating a radio access node according to an embodiment of the disclosed subject matter.

FIG. 7 shows a more general example of a radio access node that may be used in a network such as that illustrated in FIG. 5A.

Referring to FIG. 7, a radio access node 700 comprises a node processor 705, a memory 710, a network interface 715, a transceiver 720, and an antenna 725. In certain embodiments, some or all of the functionality described as being provided by a base station, a node B, an eNB, and/or any other type of network node may be provided by node processor 705 executing instructions stored on a computer-readable medium, such as memory 710 shown in FIG. 7. Alternative embodiments of radio access node 700 may comprise additional components to provide additional functionality, such as the functionality described herein and/or related supporting functionality.

Figure 8A:
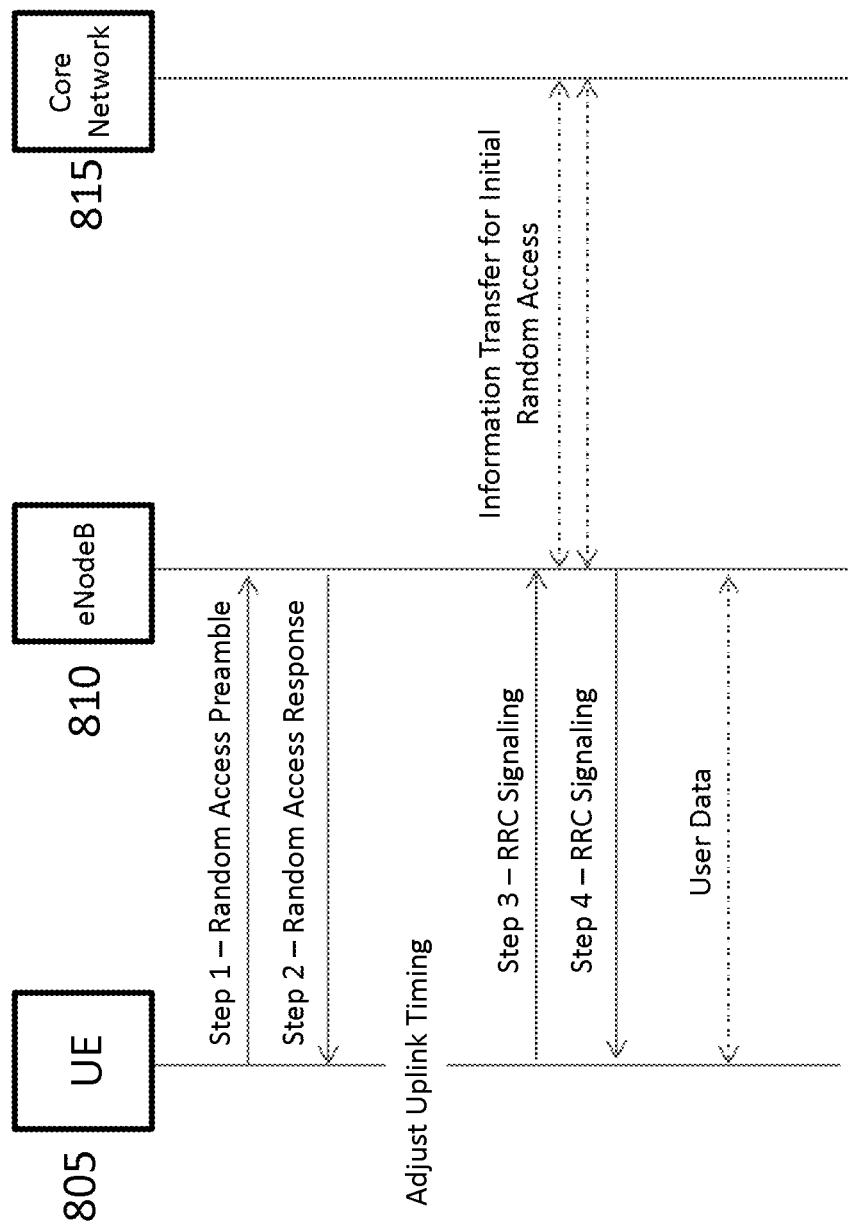
FIG. 8A is a diagram illustrating a random access process according to an embodiment of the disclosed subject matter.

Certain embodiments may be implemented in the context of a random access process such as that illustrated in FIG. 8A. As illustrated in FIG. 8A, the random access process comprises Steps 1-4 in which a UE 805 establishes a connection with an eNB 810. In the case of initial random access (i.e., where the UE is not already identified to the eNB), the random access process may further comprise information transfer from the eNB 810 to a core network 815. Notably, the random access process of FIG. 8 is a contention-based random access process. In a contention-free random access process, Steps 3-4 may be omitted and Steps 1-2 may be modified. Various additional aspects described and illustrated in relation to FIG. 8 may be modified, omitted, or expanded upon, as will be apparent to those skilled in the art. For example, the order of certain operations may be changed, or certain operations may be performed by signaling that differs from that described or illustrated in relation to FIG. 8.

In Step 1, UE 805 transmits a random access preamble to eNB 810. Among other things, the transmission of the random-access preamble allows eNB 810 to estimate the transmission timing of UE 805 for uplink synchronization, and it also allows eNB 810 to determine the classification of UE 810.

In Step 2, eNB 810 transmits a random access response to UE 805. The response typically includes a timing advance command to adjust the transmission timing of UE 805, based on the timing estimate obtained in Step 1. In addition, Step 2 also assigns uplink resources to UE 805 to be used in Step 3. The assignment of uplink resources may be determined, at least in part, by the classification of UE 805.

In Step 3, UE 805 transmits a mobile-terminal identity to eNB 810 using UL-SCH similar to normal scheduled data. The content of the signaling generally depends on the state of the UE 805, such as whether it is already known to the network. Additionally, UE 805 transmits an LCID value to eNB 810. Then, in Step 4, eNB 810 transmits a contention resolution message to UE 805 on DL-SCH.

After the UE is connected to the eNB there is a large flexibility for the eNB to realize the transport of data between the UE and the network, as illustrated by a dotted two-way arrow in FIG. 8A. Moreover, as indicated above, UEs in mobile communications networks may have different radio access capabilities, such as number of receive antennas, maximum number of layers for uplink transmission, maximum data rates in uplink and downlink, that characterize how data can be transferred and that the eNB need to know. In E-UTRA, most capabilities are conveyed from the UE to the eNB in an RRC UECapabilityInformation message that is sent upon request from the eNB, as illustratively shown in FIG. 8B.

FIG. 9 is a table of LCID values according to an embodiment of the disclosed subject matter.

Referring to FIG. 9, the standard specifies that a UE that is not yet identified by the cell shall transmit LCID 01011 if it is a Category 0 UE and LCID 00000 otherwise. In some embodiments the UE of a certain class transmits Random Access Msg 3 but with a different LCID than prescribed by the standard. In a certain context the network knows of an alternate meaning of LCIDs.

In certain embodiments the UE of a certain class transmits Random Access Msg 3 as defined in the standard but with the following exception: if the UE is not known to the cell, it transmits a predefined LCID other than 01011 or 00000 or any reserved LCID or any other LCID that could be used by a UE in Random Access Msg 3. For example, the predefined LCID could be in the range 00001 to 01010 identifying a logical channel. Such a logical channel or radio bearer is not setup for the UE before the UE is identified by the network and hence cannot be used in Random Access Msg 3 according to the standard.

An eNodeB recognizing the alternate meaning of the LCID in Random Access Msg3 and decoding the said LCID in Random Access Msg 3 understands that the UE is of the predefined non-standard UE class and treats it accordingly.

Figure 10:
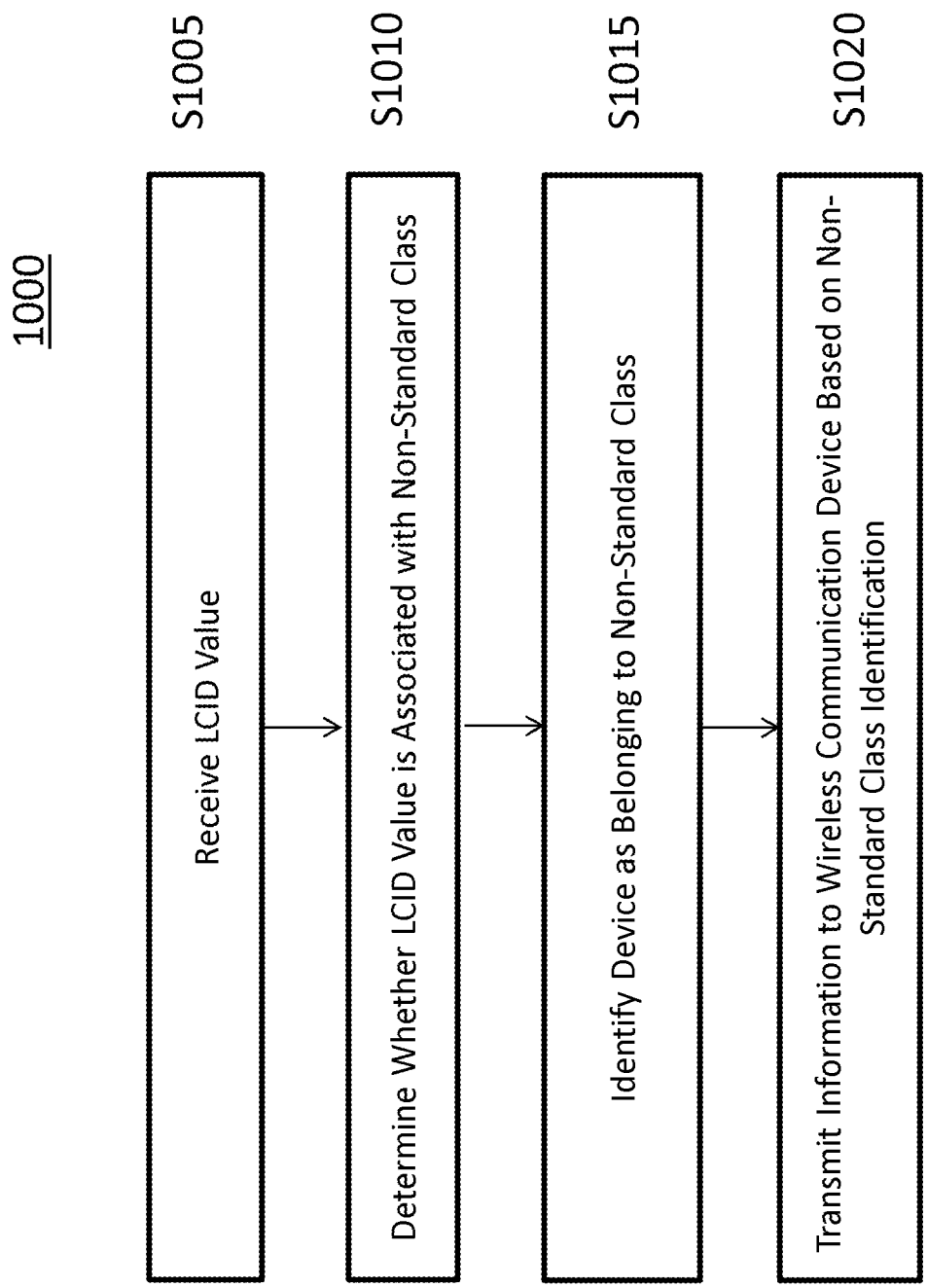
FIG. 10 is a flowchart illustrating a method of operating a radio access node according to an embodiment of the disclosed subject matter.

FIG. 10 is a flowchart illustrating a method 1000 of operating a radio access node according to an embodiment of the disclosed subject matter.

Referring to FIG. 10, the method comprises receiving an LCID value from a wireless communication device (S1005), determining whether the received LCID value is associated with a non-standard class of wireless communication device (S1010), and in response to determining that the received LCID value is associated with the non-standard class of wireless communication device, identifying the wireless communication device as belonging to the non-standard class of wireless communication device (S1015), and transmitting information to the wireless communication device based on the non-standard class identification (S1020).

In certain embodiments, the method further comprises reserving a first subset of available LCID values for identification of logical channels in a MAC layer of E-UTRA, and reserving a second subset of the available LCID values for identification of one or more non-standard classes of wireless communication device, wherein the received LCID value is within the second subset of the available LCID values.

In certain embodiments, the method further comprises determining whether the wireless communication device is known to a cell associated with the radio access node, and performing the determination of whether the received LCID value is associated with the non-standard class of wireless communication device in response to determining that the wireless communication device is not known to the cell.

In certain embodiments, the transmitting of information to the wireless communication device based on the non-standard class identification comprises assigning resources or performing control functions based on the non-standard class identification. In one example, such control functions may include, e.g., controlling how fast the wireless communication device needs to send Msg3 after having received the Random Access Response.

In certain embodiments, the LCID value is within a range of 00001 to 01010. In certain embodiments, the non-standard class of wireless communication device is a partially standard-compliant class of wireless communication device. In certain embodiments, the LCID value is received in Random Access Message 3. In certain embodiments, the method further comprises, in response to identifying the wireless communication device as belonging to the non-standard class of wireless communication device, performing repetition or power boosting of the transmission for increased coverage.

Figure 11:
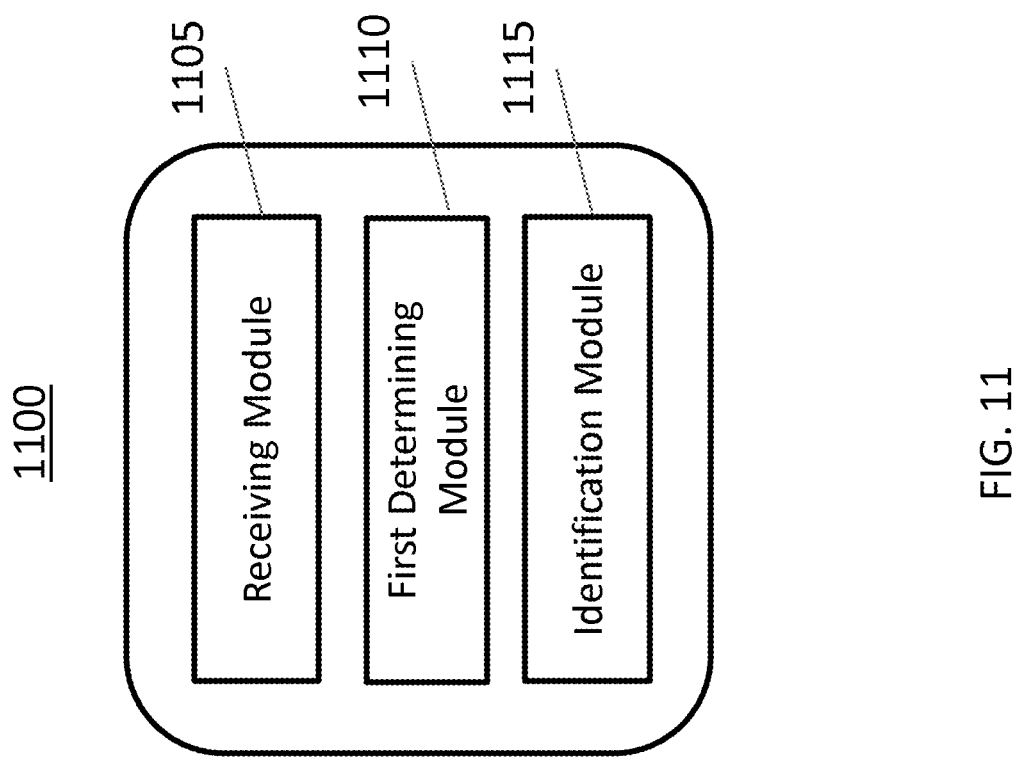
FIG. 11 is a diagram illustrating a radio access node according to an embodiment of the disclosed subject matter.

FIG. 11 is a diagram illustrating a radio access node 1100 according to an embodiment of the disclosed subject matter. The term "module", as used in conjunction with this and other embodiments, denotes any suitable combination of hardware and/or software capable of performing the designated functions.

Referring to FIG. 11, radio access node 1100 comprises a receiving module 1105 configured to receive an LCID value from a wireless communication device, a first determining module 1110 configured to determine whether the received LCID value is associated with a non-standard class of wireless communication device, and an identification module 1115 and a transmission module collectively configured to, in response to determining that the received LCID value is associated with the non-standard class of wireless communication device, identify the wireless communication device as belonging to the non-standard class of wireless communication device and transmit information to the wireless communication device based on the non-standard class identification.

In certain embodiments, the radio access node further comprises a first reserving module configured to reserve a first subset of available LCID values for identification of logical channels in a medium access control (MAC) layer of Evolved Universal Terrestrial Radio Access (E-UTRA), and a second reserving module configured to reserve a second subset of the available LCID values for identification of one or more non-standard classes of wireless communication device, wherein the received LCID value is within the second subset of the available LCID values.

In certain embodiments, the radio access node further comprises a second determining module configured to determine whether the wireless communication device is known to a cell associated with the radio access node, and a third determining module configured to perform the determination of whether the received LCID value is associated with the non-standard class of wireless communication device in response to determining that the wireless communication device is not known to the cell.

In certain embodiments, the transmission of information to the wireless communication device based on the non-standard class identification comprises assigning resources or performing control functions based on the non-standard class identification.

In certain embodiments, the LCID value is within a range of 00001 to 01010. In certain embodiments, the LCID value is received in Random Access Message 3. In certain embodiments, the radio access node further comprises a repetition module or power boosting module configured to, in response to identifying the wireless communication device as belonging to the non-standard class of wireless communication device, perform repetition or power boosting of the transmission for increased coverage.

In certain embodiments, the transmission of information to the wireless communication device based on the non-standard class identification comprises performing one or more control functions based on the non-standard class identification to restrict how fast the wireless communication device needs to send a Message 3 after receiving a Random Access Response from the radio access node.

Figure 12:
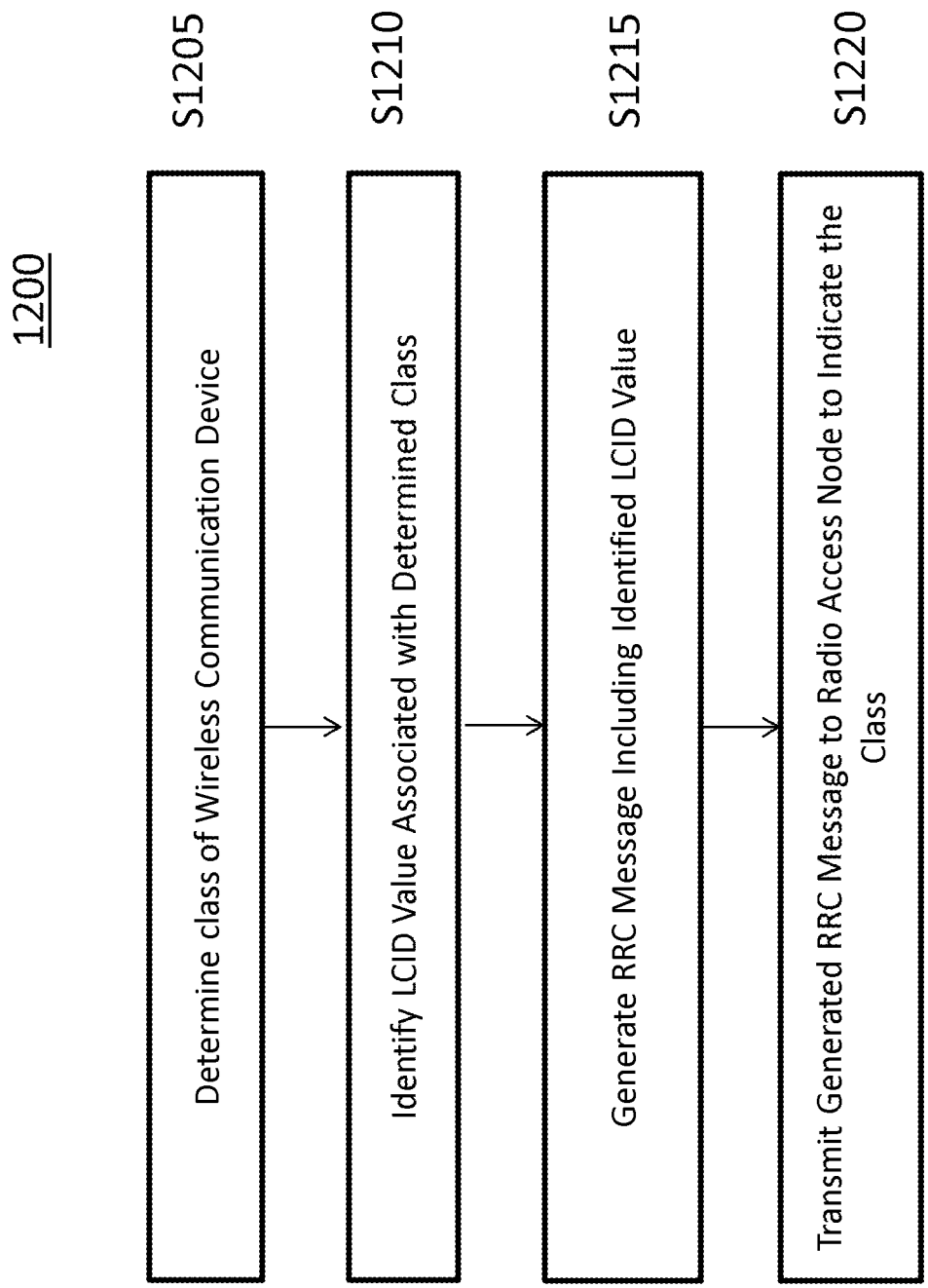
FIG. 12 is a flowchart illustrating a method of operating a wireless communication device according to an embodiment of the disclosed subject matter.

FIG. 12 is a flowchart illustrating a method 1200 of operating a wireless communication device according to an embodiment of the disclosed subject matter.

Referring to FIG. 12, the method comprises determining a class of the wireless communication device (S1205), identifying an LCID value that is associated with the determined class in a radio access node of the wireless communication network (S1210), generating an RRC message including the identified LCID value (S1215), and transmitting the generated RRC message to the radio access node to indicate the class (S1220).

In certain embodiments, the LCID value is within a subset of available LCID values that has been reserved for identification of one or more non-standard classes of wireless communication device, wherein the subset is distinguishable from another subset of the available LCID values that has been reserved for identification of logical channels in a MAC layer of E-UTRA. In certain embodiments, the method further comprises receiving control information from the radio access node to control how fast the wireless communication device needs to send a Message 3 after receiving a Random Access Response, wherein the control information is associated with the determined class.

In certain embodiments, the LCID value is within a range of 00001 to 01010. In certain embodiments, the determined class is a non-standard class of wireless communication device. In certain embodiments, the non-standard class of wireless communication device is a partially standard-compliant class of wireless communication device.

Figure 13:
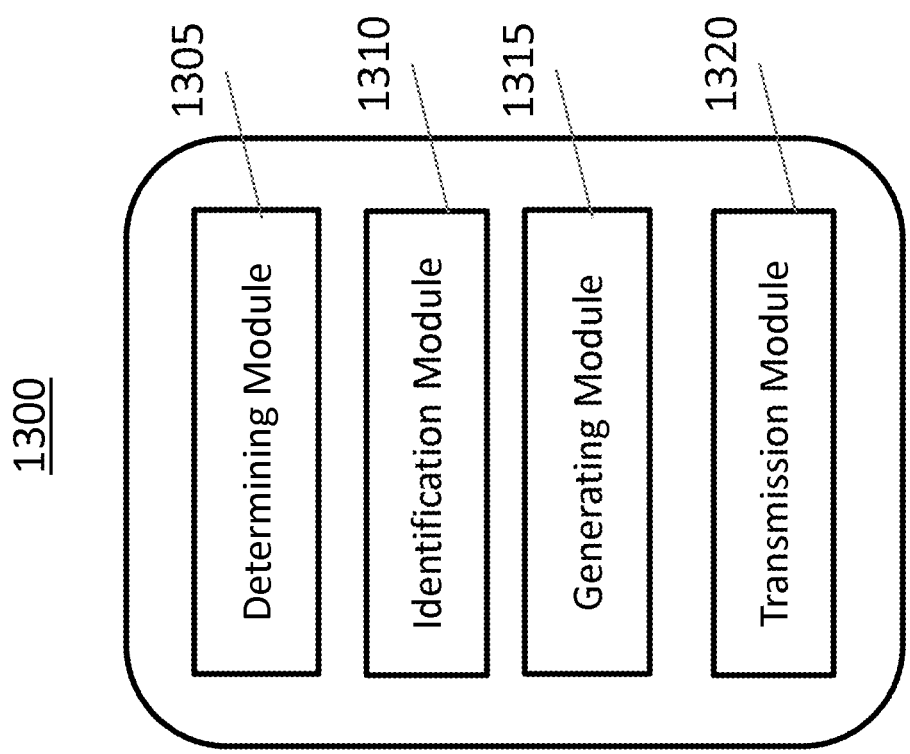
FIG. 13 is a diagram illustrating a wireless communication device according to an embodiment of the disclosed subject matter.

FIG. 13 is a diagram illustrating a wireless communication device 1300 according to an embodiment of the disclosed subject matter.

Referring to FIG. 13, wireless communication device 1300 comprises a determining module 1305 configured to determine a class of the wireless communication device, an identification module 1310 configured to identify an LCID value that is associated with the determined class in a radio access node of the wireless communication network, a generating module 1315 configured to generate an RRC message including the identified LCID value, and a transmission module 1320 configured to transmit the generated RRC message to the radio access node to indicate the class.

In certain embodiments, the LCID value is within a subset of available LCID values that has been reserved for identification of one or more non-standard classes of wireless communication device, wherein the subset is distinguishable from another subset of the available LCID values that has been reserved for identification of logical channels in a MAC layer of E-UTRA.

In certain embodiments, the wireless communication device further comprises a receiving module configured to receive control information from the radio access node to control how fast the wireless communication device needs to send a Message 3 after receiving a Random Access Response, wherein the control information is associated with the determined class. In certain embodiments, the LCID value is within a range of 00001 to 01010. In certain embodiments, the determined class is a non-standard class of wireless communication device. In certain embodiments, the non-standard class of wireless communication device is a partially standard-compliant class of wireless communication device.

As indicated by the foregoing, certain embodiments of the disclosed subject matter allow a wireless communication device to indicate its class to a radio access node using an LCID value, and further allow the radio access node to recognize the class and take appropriate actions based on the LCID value. These and other embodiments may allow for identification of a variety of different classes of wireless communication devices in ways that overcome the identified shortcomings of previous and/or alternative approaches as described above.

While the disclosed subject matter has been presented above with reference to various embodiments, it will be understood that various changes in form and details may be made to the described embodiments without departing from the overall scope of the disclosed subject matter.

In the above-description, it is to be understood that the terminology used herein is for the purpose of describing particular embodiments only and is not intended to be limiting of the disclosed subject matter in general. Unless otherwise defined, all terms (including technical and scientific terms) used herein have the same meaning as commonly understood by those of ordinary skill in the art. Terms such as those defined in commonly used dictionaries should be interpreted as having a meaning consistent with their meaning in the context of this specification and the relevant art and will not be interpreted in an idealized or overly formal sense unless expressly indicated to the contrary.

Where a feature is described as being "connected", "responsive", or variants thereof to another feature, it can be directly connected or responsive to the other element or intervening elements may be present. Furthermore, "coupled", "connected", "responsive", or variants thereof as used herein may include wirelessly connected or responsive. As used herein, the singular forms "a", "an" and "the" are intended to include the plural forms as well, unless the context clearly indicates otherwise. Well-known functions or constructions may not be described in detail for the sake of brevity and/or clarity. The term "and/or" includes any and all combinations of one or more of the associated listed items.

Although the terms first, second, third, etc. may be used herein to describe various features, these features should not be limited by these terms. Rather, these terms are used merely to distinguish one feature from another. Thus a first feature could alternatively be termed a second feature and vice-versa without departing from the presented teachings.

As used herein, terms such as "comprise", "comprising", "comprises", "include", "including", "includes", "have", "has", "having", etc., are open-ended, and include one or more stated features but does not preclude the presence or addition of other features.

Certain embodiments are described herein with reference to block diagrams and/or flowchart illustrations of computer-implemented methods, apparatus (systems and/or devices) and/or computer program products. A block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, certain embodiments may be implemented in hardware and/or in software (including firmware, resident software, micro-code, etc.) that runs on a processor such as a digital signal processor, which may collectively be referred to as "circuitry," "a module" or variants thereof.

In some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the disclosed subject matter. Moreover, although some of the diagrams include arrows on communication paths to show a primary direction of communication, it is to be understood that communication may occur in the opposite direction to the depicted arrows.

Many variations and modifications can be made to the embodiments without departing from the scope of the disclosed subject matter. All such variations and modifications are intended to be included herein within the scope of the disclosed subject matter. Accordingly, the above disclosed subject matter is to be considered illustrative, and not restrictive, and the appended examples of embodiments are intended to cover all such modifications, enhancements, and other embodiments, which fall within the scope of the disclosed subject matter.

The invention claimed is:

1. A method of operating a radio access node, comprising:
receiving a logical channel identifier (LCID) value from a wireless communication device, wherein the LCID value is within a range of 00001 to 01010;
determining whether the received LCID value is associated with a non-standard class of wireless communication device; and
in response to determining that the received LCID value is associated with the non-standard class of wireless communication device, identifying the wireless communication device as belonging to the non-standard class of wireless communication device and transmitting information to the wireless communication device based on the non-standard class identification.

2. The method of claim 1, further comprising:
reserving a first subset of available LCID values for identification of logical channels in a medium access control (MAC) layer of Evolved Universal Terrestrial Radio Access (E-UTRA); and
reserving a second subset of the available LCID values for identification of one or more non-standard classes of wireless communication device, wherein the received LCID value is within the second subset of the available LCID values.

3. The method of claim 1, further comprising:
determining whether the wireless communication device is known to a cell associated with the radio access node; and
performing the determination of whether the received LCID value is associated with the non-standard class of wireless communication device in response to determining that the wireless communication device is not known to the cell.

4. The method of claim 1, wherein transmitting information to the wireless communication device based on the non-standard class identification comprises assigning resources or performing control functions based on the non-standard class identification.

5. The method of claim 1, wherein the non-standard class of wireless communication device is a partially standard-compliant class of wireless communication device.

6. The method of claim 1, wherein the LCID value is received in Random Access Message 3.

7. The method of claim 1, further comprising, in response to identifying the wireless communication device as belonging to the non-standard class of wireless communication device, performing repetition or power boosting of the transmission for increased coverage.

8. The method of claim 1, wherein transmitting information to the wireless communication device based on the non-standard class identification comprises performing one or more control functions based on the non-standard class identification to restrict how fast the wireless communication device needs to send a Message 3 after receiving a Random Access Response from the radio access node.

9. A method of operating a wireless communication device in a wireless communication network, comprising:
determining a class of the wireless communication device, wherein the determined class is a non-standard class of wireless communication device;
identifying a logical channel identifier (LCID) value that is associated with the determined class in a radio access node of the wireless communication network wherein the LCID value is within a range of 00001 to 01010;
generating a radio resource control (RRC) message including the identified LCID value; and
transmitting the generated RRC message to the radio access node to indicate the class.

10. The method of claim 9, wherein the LCID value is within a subset of available LCID values that has been reserved for identification of one or more non-standard classes of wireless communication device, wherein the subset is distinguishable from another subset of the available LCID values that has been reserved for identification of logical channels in a medium access control (MAC) layer of Evolved Universal Terrestrial Radio Access (E-UTRA).

11. The method of claim 9, further comprising receiving control information from the radio access node to control how fast the wireless communication device needs to send a Message 3 after receiving a Random Access Response, wherein the control information is associated with the determined class.

12. The method of claim 9, wherein the non-standard class of wireless communication device is a partially standard-compliant class of wireless communication device.

13. The method of claim 9, further comprising:
receiving information transmitted by the radio access node based on an identification of the wireless communication device as belonging to a non-standard class.

14. A radio access node, comprising:
at least one processor configured to:
receive a logical channel identifier (LCID) value from a wireless communication device wherein the LCID value is within a range of 00001 to 01010;
determine whether the received LCID value is associated with a non-standard class of wireless communication device; and
in response to determining that the received LCID value is associated with the non-standard class of wireless communication device, identify the wireless communication device as belonging to the non-standard class of wireless communication device and transmit information to the wireless communication device based on the non-standard class identification.

15. The radio access node of claim 14, wherein the at least one processor is further configured to:
reserve a first subset of available LCID values for identification of logical channels in a medium access control (MAC) layer of Evolved Universal Terrestrial Radio Access (E-UTRA); and
reserve a second subset of the available LCID values for identification of one or more non-standard classes of wireless communication device, wherein the received LCID value is within the second subset of the available LCID values.

16. The radio access node of claim 14, wherein the at least one processor is further configured to:
determine whether the wireless communication device is known to a cell associated with the radio access node; and
perform the determination of whether the received LCID value is associated with the non-standard class of wireless communication device in response to determining that the wireless communication device is not known to the cell.

17. The radio access node of claim 14, wherein the transmission of information to the wireless communication device based on the non-standard class identification comprises assigning resources or performing control functions based on the non-standard class identification.

18. The radio access node of claim 14, wherein the non-standard class of wireless communication device is a partially standard-compliant class of wireless communication device.

19. The radio access node of claim 14, wherein the LCID value is received in Random Access Message 3.

20. The radio access node of claim 14, wherein the at least one processor is further configured to, in response to identifying the wireless communication device as belonging to the non-standard class of wireless communication device, perform repetition or power boosting of the transmission for increased coverage.

21. The radio access node of claim 14, wherein the transmission of information to the wireless communication device based on the non-standard class identification comprises performing one or more control functions based on the non-standard class identification to restrict how fast the wireless communication device needs to send a Message 3 after receiving a Random Access Response from the radio access node.

22. A wireless communication device, comprising:
at least one processor configured to:
determine a class of the wireless communication device, wherein the determined class is a non-standard class of wireless communication device;
identify a logical channel identifier (LCID) value that is associated with the determined class in a radio access node of the wireless communication network, wherein the LCID value is within a range of 00001 to 01010;
generate a radio resource control (RRC) message including the identified LCID value; and
transmit the generated RRC message to the radio access node to indicate the class.

23. The wireless communication device of claim 22, wherein the LCID value is within a subset of available LCID values that has been reserved for identification of one or more non-standard classes of wireless communication device, wherein the subset is distinguishable from another subset of the available LCID values that has been reserved for identification of logical channels in a medium access control (MAC) layer of Evolved Universal Terrestrial Radio Access (E-UTRA).

24. The wireless communication device of claim 22, wherein the at least one processor is further configured to receive control information from the radio access node to control how fast the wireless communication device needs to send a Message 3 after receiving a Random Access Response, wherein the control information is associated with the determined class.

25. The wireless communication device of claim 22, wherein the non-standard class of wireless communication device is a partially standard-compliant class of wireless communication device.

26. The wireless communication device of claim 22, wherein the at least one processor is further configured to receive information transmitted by the radio access node based on an identification of the wireless communication device as belonging to a non-standard class.

\* \* \* \* \*